Sept. 20, 1932.  F. A. FLEISCHMANN ET AL  1,878,835
WEIGHING HEAD FOR DYNAMOMETER APPARATUS
Filed April 29, 1930   3 Sheets-Sheet 1
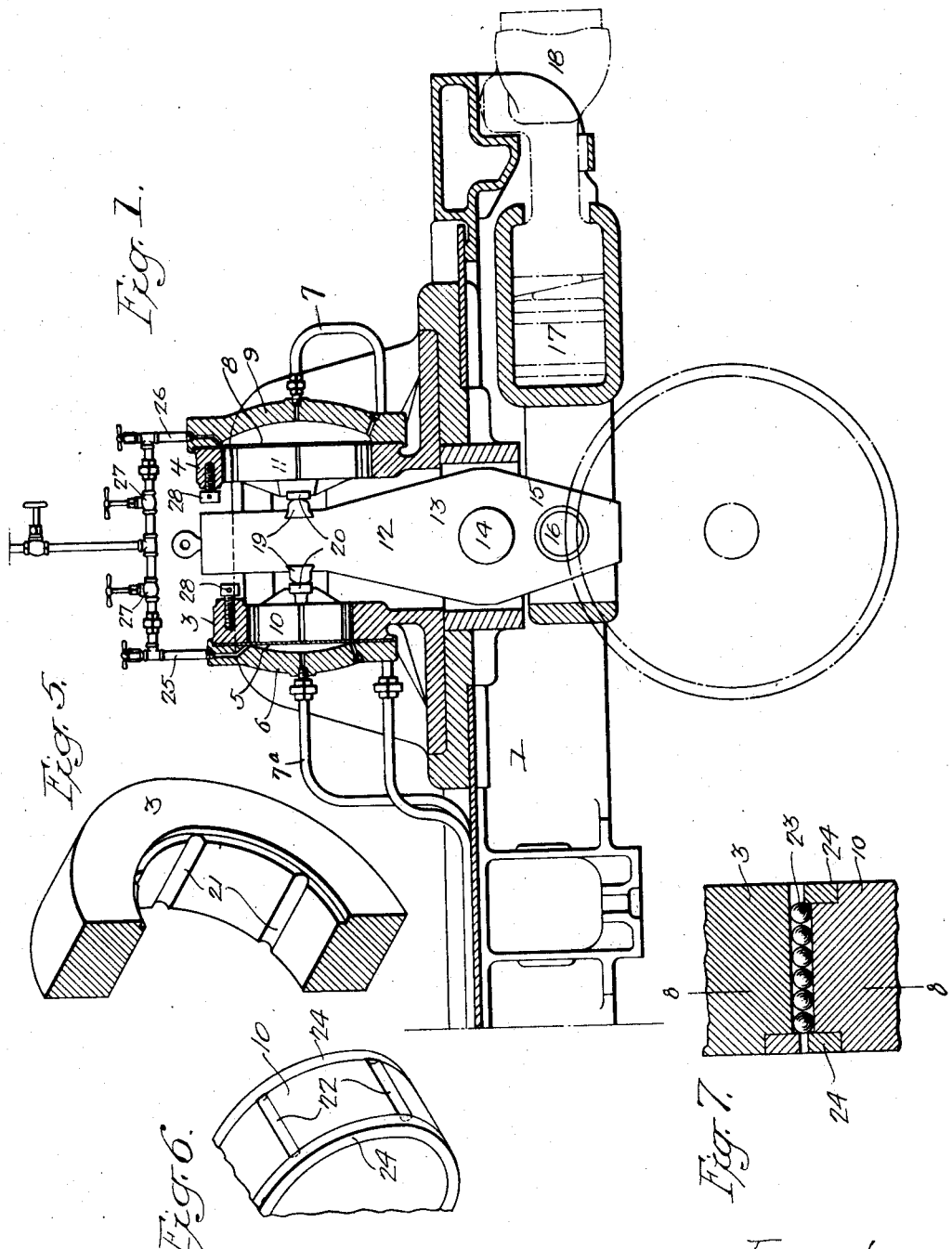
Inventors:—
Frederick A. Fleischmann,
Alpha L. Marsh
by their Attorneys

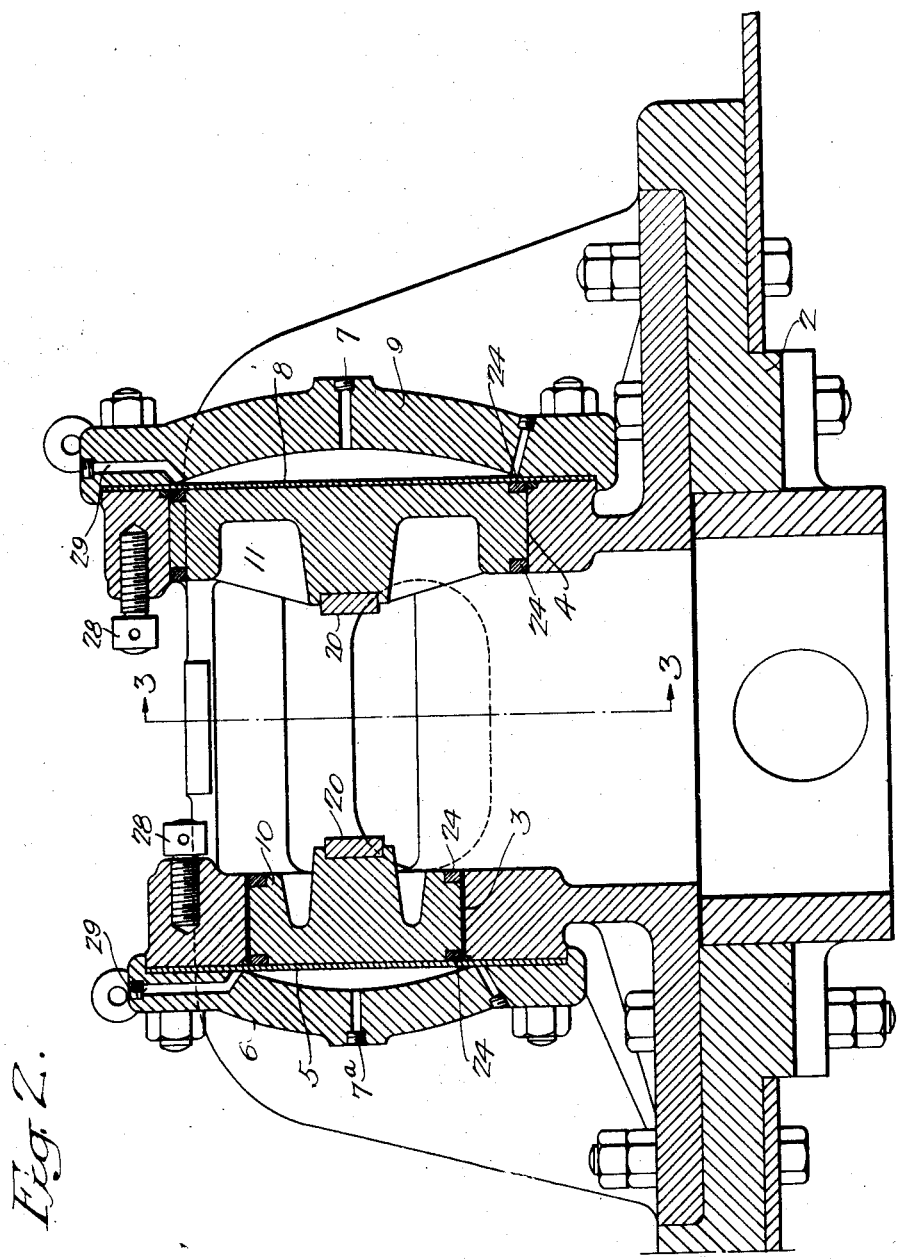

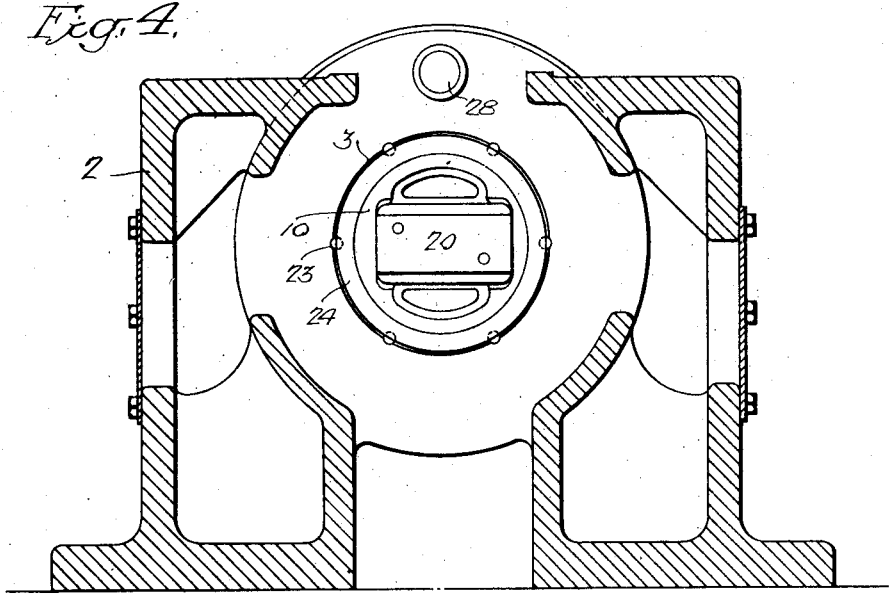
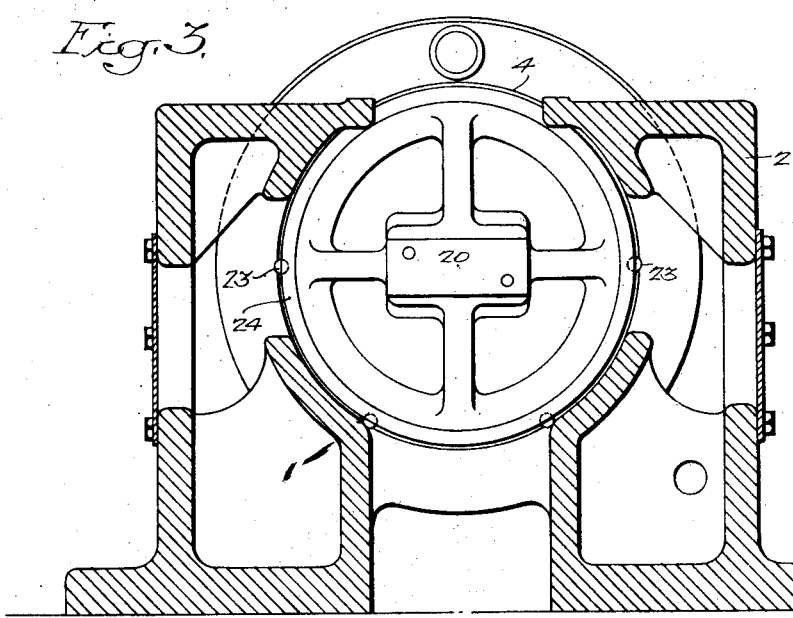
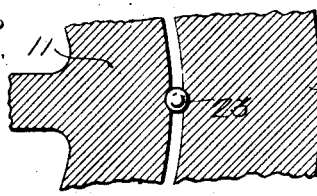

Patented Sept. 20, 1932

1,878,835

UNITED STATES PATENT OFFICE

FREDERICK A. FLEISCHMANN, OF DREXEL HILL, AND ALPHA L. MARSH, OF PHILADELPHIA, PENNSYLVANIA

WEIGHING HEAD FOR DYNAMOMETER APPARATUS

Application filed April 29, 1930. Serial No. 448,315.

This invention relates to certain improvements in weighing heads which are located on dynamometer cars used on railroads.

One object of the invention is to properly balance the pistons, which are located in the cylinders of the weighing head.

A further object of the invention is to reduce the friction between the piston and the cylinders.

A still further object of the invention is to center the pistons in respect to the cylinders, by means of balls adapted to recesses in both cylinders and pistons.

In the accompanying drawings:

Fig. 1 is a longitudinal sectional view of sufficient of one end of a dynamometer car to illustrate our invention;

Fig. 2 is a longitudinal sectional view of the dynamometer cylinders and the pistons partly in section;

Fig. 3 is a sectional view on the line 3—3, Fig. 2, looking toward the large cylinder;

Fig. 4 is a view also on the line 3—3, Fig. 2, looking toward the small cylinder;

Fig. 5 is a detached perspective view of a portion of one of the cylinders, showing the groove for the balls;

Fig. 6 is a detached perspective view of one of the pistons, showing the groove for the balls;

Fig. 7 is a view showing a series of balls in the groove in the cylinder and piston; and Fig. 8 is a sectional view on the line 8—8, Fig. 7.

1 is the frame of a dynamometer car. Mounted on the frame is a heavy casting 2 forming the base of the dynamometer weighing head. Securely bolted to the base are two cylinders 3 and 4. 3 is the pull cylinder and 4 is the buff cylinder. The cylinder 3 is open at one end and is closed at the opposite end by a diaphragm 5 held in place by a cap 6, which is securely bolted to the cylinder. The cap is dished so as to form a fluid space between the cap and the diaphragm, and communicating with this space is a fluid pipe 7a leading to the pull indicator on the recording table.

The buff cylinder 4 is open at one end and is closed at the opposite end by a diaphragm 8, which is held in place by a cap 9, which is dished to form a fluid space between the diaphragm and the cap. This cap is securely attached to the buff cylinder 4. The space between the diaphragm and the cap is connected by a tube 7 to the buff indicator on the recording table.

Mounted in the pull cylinder 3 is a piston 10, and mounted in the buff cylinder 4 is a piston 11. Each of these pistons has a wear plate 20, and extending between the cylinders is the long arm 12 of a lever 13, which is pivoted at 14, and the short arm 15 of the lever is connected by a pin 16 to the draw-head 17 of the car. Connected to this draw-head 17 is a coupling 18 of any suitable type. The long arm 12 of the lever has hard metal bearing blocks 19 which bear upon the two plates 20 of the pistons 10 and 11, so that any longitudinal movement of the draw-head is transmitted to the pistons 10 and 11 through the lever 13.

In order to center the pistons in the cylinders and to reduce the friction between the cylinders and the pistons, as well as to properly balance the pistons, we form a series of grooves 21 in the inner wall of each cylinder and we form corresponding grooves 22 in the periphery of each piston and locate in these grooves a series of balls 23. The balls are held in place by steel rings 24, which are shrunk on each end of each piston as shown in Fig. 2.

Each piston has a very limited longitudinal movement, but it must be free to move and move correctly, as its movement is transmitted to the indicators on the recording table, from which calculations are made.

In order to add more liquid to the system when it is necessary, the jack-screws 28 are turned so as to lock the weighing head lever in the central position. The liquid is supplied from a reserve tank placed overhead in the car through pipes 25 and 26, which are provided with suitable valves 27, the pipes communicating with passages 29 in the upper portion of each cylinder cap, as shown in Fig. 1. The piston movement on the maximum draw-bar pull is very limited. The larger cylinder 4, which is located towards the front end of the car, takes the high buffing shocks as mentioned above. The weighing head connects the draw-bar to the hydraulic pistons and transfers the movement of the draw-bar through sensitive instruments connected to the pressure chambers of the weighing head to movable pens on the recording table, which mark a suitable recording paper, the details of which are not shown.

We claim:

1. The combination in a weighing head for a dynamometer car, of two horizontally arranged cylinders, one greater in diameter than the other and arranged end-to-end, the cylinders being open towards each other; a diaphragm closing the distant end of each cylinder; a cap secured to each cylinder beyond each diaphragm and spaced from the diaphragm; means placing said space in communication with indicating mechanism of the dynamometer; a piston in each cylinder; a lever for actuating the pistons, said lever extending between the pistons and in contact therewith; a draw-head of the car connected to the lever, the pistons being less in diameter than the cylinder; and a series of balls located between each piston and cylinder, said balls holding the pistons in alignment with the cylinders and allowing the pistons to move freely on the movement of the lever which is connected to the draw-head.

2. The combination in a weighing head for dynamometer cars, of a base; two cylinder structures mounted horizontally on the base, one cylinder structure being greater in diameter than the other; diaphragms and caps closing one end of each cylinder; a piston in each cylinder; anti-friction balls between each piston and its cylinder; an operating lever having a short and a long arm, the long arm of the lever extending between the pistons and in contact therewith and controlling the movement of the pistons of the weighing head, the short arm of the lever being connected to the draw-head; and a jack-screw on each cylinder structure to restrict the movement of the lever within its safe limit of travel.

FREDERICK A. FLEISCHMANN.
ALPHA L. MARSH.